United States Patent [19]

Brandt et al.

[11] 4,150,480

[45] Apr. 24, 1979

[54] PROCESS FOR SHIPPING AND PLACING FLEXIBLE TRANSMISSION LINE INTO SERVICE

[75] Inventors: Thomas F. Brandt, Swarthmore; Philip C. Netzel, Milmont Park, both of Pa.

[73] Assignee: Electric Power Research Institute, Palo Alto, Calif.

[21] Appl. No.: 808,708

[22] Filed: Jun. 21, 1977

[51] Int. Cl.$^2$ .............................................. H02G 1/00

[52] U.S. Cl. ........................................ 29/628; 156/48; 174/10; 174/25 G; 174/25 P; 174/28

[58] Field of Search ..................... 174/10, 25 G, 25 P, 174/26 G, 28; 29/592, 593, 624, 628; 61/105; 156/48

[56] References Cited

U.S. PATENT DOCUMENTS

| | | | |
|---|---|---|---|
| 3,391,243 | 7/1968 | Whitehead | 174/28 |
| 3,403,063 | 9/1968 | Walker | 174/25 G X |
| 4,063,691 | 12/1977 | Bacvarov | 174/10 X |

FOREIGN PATENT DOCUMENTS

| | | | |
|---|---|---|---|
| 375867 | 7/1932 | United Kingdom | 174/25 P |

*Primary Examiner*—Laramie E. Askin
*Attorney, Agent, or Firm*—Ostrolenk, Faber, Gerb & Soffen

[57] ABSTRACT

An elongated flexible gas-insulated transmission line cable is fitted with pressure-tight termination assemblies at its opposite ends before it is placed on a reel for shipment. The cable is then filled with dry gas, such as nitrogen, at a relatively low positive pressure and the cable is then reeled and shipped. The cable terminal ends are adapted for easy connection to other circuit components without requiring access to the interior of the cable and the terminals permit the purging of the nitrogen gas and the installation of sulfur hexafluoride or some other electronegative gas before the cable is placed into operation.

7 Claims, 9 Drawing Figures

FIG. 1 PRIOR ART
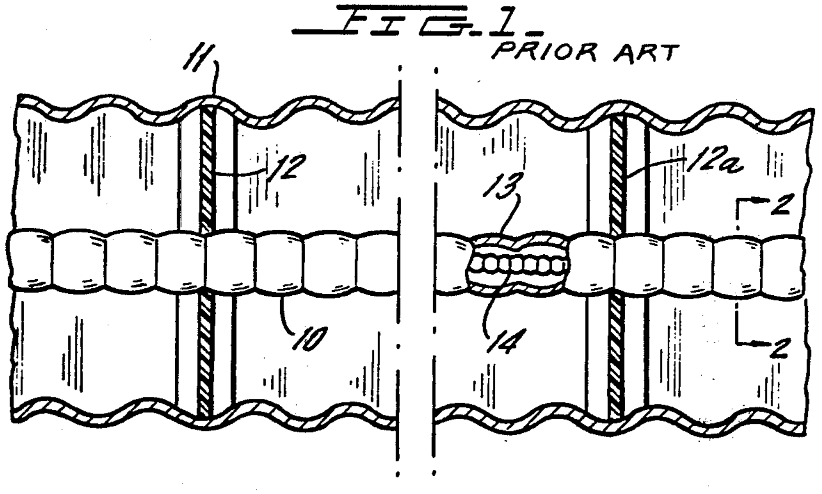
FIG. 2 PRIOR ART
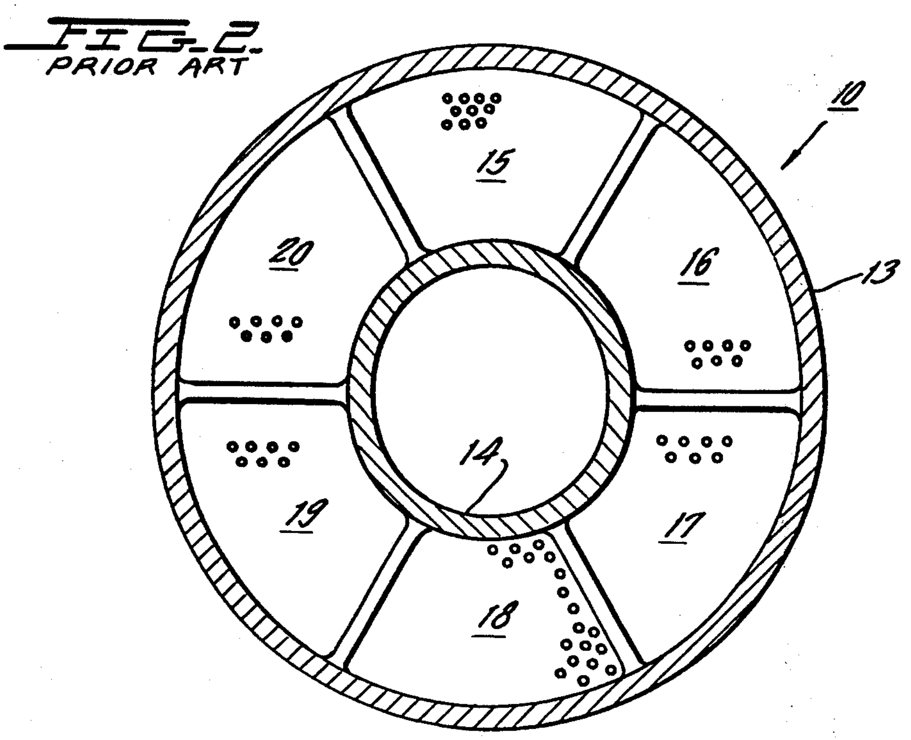
FIG. 6 PRIOR ART
FIG. 7 PRIOR ART
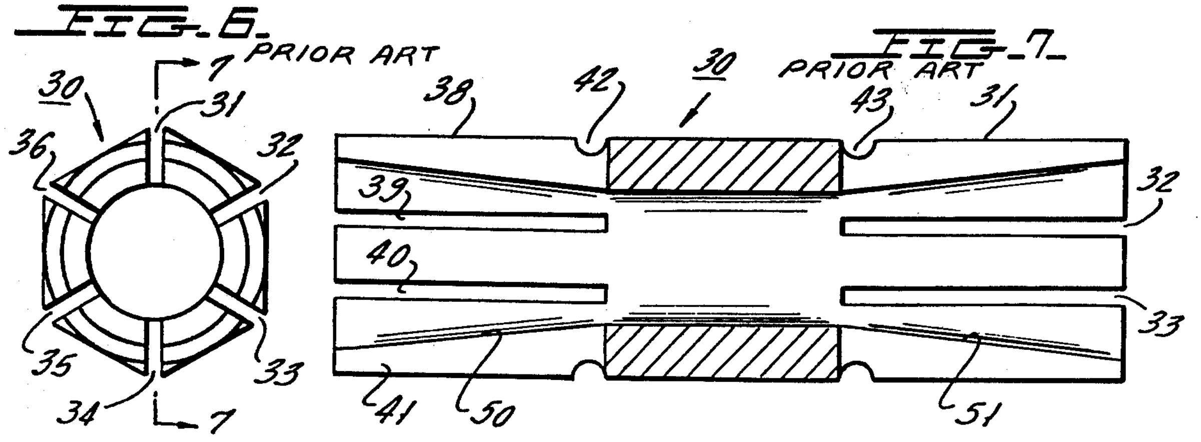

PROCESS FOR SHIPPING AND PLACING FLEXIBLE TRANSMISSION LINE INTO SERVICE

RELATED APPLICATIONS

This application is related to copending application Ser. No. 771,943, filed Feb. 25, 1977, in the name of Philip C. Netzel, entitled TERMINATION FOR STRANDED CABLE and is also related to copending application Ser. No. 661,121, filed Feb. 25, 1976, in the name of Dosio C. Bacvarov, entitled DRUM FOR TRANSPORTATION OF FLEXIBLE ELECTRIC POWER CABLE, now U.S. Pat. No. 4,063,691.

BACKGROUND OF THE INVENTION

This invention relates to flexible gas-insulated transmission line cable, and more specifically relates to a novel structure for a factory-assembled reel of cable which has pressure-tight fittings at its opposite ends to enable the loading of an insulation gas into the cable when the cable is unreeled and placed in position for installation.

Flexible gas-insulated transmission line cable is well known wherein the cable consists of a central flexible conductor which is supported within an outer grounded housing which is filled with a suitable insulation gas, such as sulfur hexafluoride, under some positive pressure such as 3 atmospheres. This cable is then used in systems for the transmission of extremely high voltages, for example, 345 kV in electrical power line systems.

Flexible cable has the advantage that the cable may be wound on a reel and shipped in relatively long lengths which minimizes installation costs and assembly difficulties which exist in the case of rigid gas-insulated transmission line which is normally shipped in lengths of about 50 feet. By contrast, a flexible cable system may be wound on a reel and shipped in 100 meter lengths.

BRIEF DESCRIPTION OF THE PRESENT INVENTION

In accordance with the present invention, the flexible bus which is made in reel lengths which, typically, are about 100 meters, is fitted with pressure-tight termination assemblies in the factory before it is wound on a reel for shipment. Each length of cable will then be pressure-tested prior to shipment and is then filled with dry, low pressure nitrogen. The nitrogen will be at a slight positive pressure of, for example, 4 to 5 p.s.i.g. Consequently, it is insured that the interior of the cable will be dry and clean when it is installed in the field. After the cable is unreeled and ready for installation, the nitrogen gas will be purged and the interior of the cable is filled with sulfur hexafluoride gas at a relatively high pressure of about 45 p.s.i.g.

The two end terminations of the cable may be of the type shown in copending application Ser. No. 771,943, so that connection can be made to the terminal ends without having to penetrate the cable. Consequently, when using the present invention, each self-contained and factory-sealed reel length of cable is immediately ready for installation as soon as it is received at the installation site without need for electrical tests or cleaning.

BRIEF DESCRIPTION OF THE DRAWINGS

FIG. 1 is a longitudinal cross-sectional view through the axis of a flexible gas-insulated bus which can be terminated in accordance with the present invention.

FIG. 2 is a cross-sectional view of a portion of FIG. 1 taken along the line 2—2 to illustrate the construction of the stranded flexible bus conductor.

FIG. 6 is an end view of the novel terminal expander cylinder which can be used with the present invention which is shown in FIGS. 3 and 4 as pressing the stranded aluminum conductor against an outer conductive cylinder.

FIG. 7 is a cross-sectional view of FIG. 6 taken across the section line 7—7 in FIG. 6.

DETAILED DESCRIPTION OF THE DRAWINGS

Figure 9:
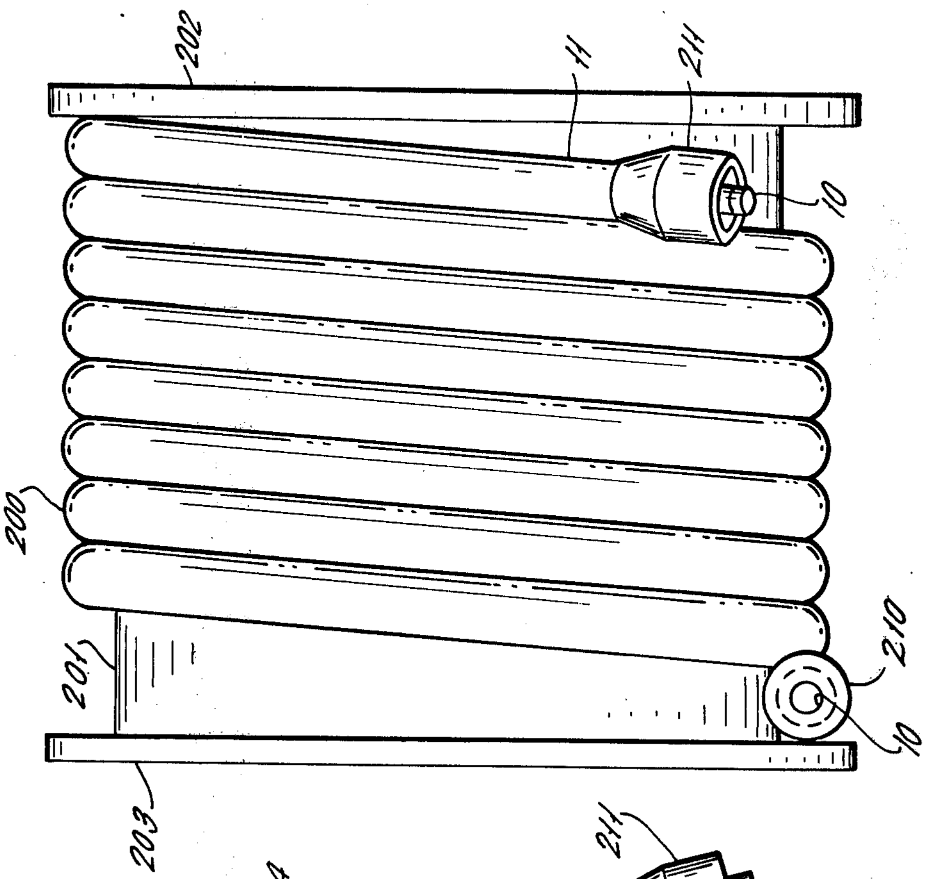
FIG. 9 is a side view of the reel of FIG. 8.
Figure 8:
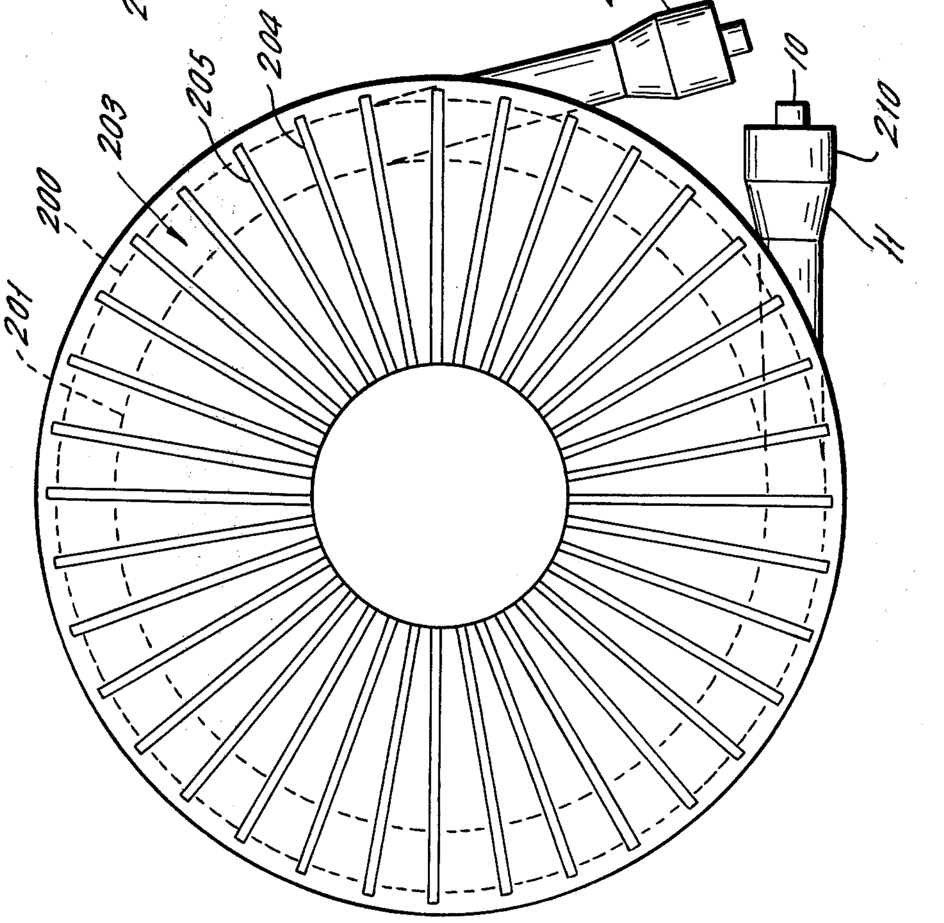
FIG. 8 is an elevation view of a reel of flexible cable constructed in accordance with the present invention.

Referring first to FIGS. 8 and 9, there is shown a unit shipping reel constructed in accordance with the present invention. Thus, the reel contains a unit length of flexible gas-insulated cable 200 which is wound on a circular spool 201 of suitable strength. The spool 201 has end walls 202 and 203, where the end walls may contain reinforcing ribs such as ribs 204 and 205, shown in FIG. 8, to aid in the reinforcement of the end walls and of the reel assembly. Cable 200 consists of nine turns formed in a single layer along the spool 201. Thus, if the spool 201 has a diameter of about 3½ meters, the cable 200 will have a length of about 100 meters. The diameter of end walls 202 and 203 may be about 4.5 meters and the spool length may be about 3 meters. The reel diameter is preferably at least 10 times that of the cable diameter.

In accordance with the invention, the cable 200 is provided with end terminations 210 and 211 which will enable the interior of the cable 200 to be filled with nitrogen at a pressure of from four to five p.s.i.g. at the factory, and prior to reeling. The terminations 210 and 211 also enable the purging of the nitrogen gas once the reel has reached the assembly site and has been unreeled, and will enable the filling of the cable with sulfur hexafluoride gas at a pressure of about 45 p.s.i.g. The terminations 210 and 211 are identical in construction and each may be of the type which is described in copending application Ser. No. 771,943.

In the following, the termination described in FIGS. 1 to 7 is identical to that of FIGS. 1 to 7 of application Ser. No. 771,943.

Referring to FIGS. 1 and 2, there is illustrated a section of a gas-insulated transmission line of flexible construction. Thus, the transmission line section of FIG. 1 may have any desired length and consists of a central flexible conductor 10 supported within a flexible outer metallic housing 11. The outer housing 11 may have an outer diameter greater than about 250 millimeters, and, for example, of 300 millimeters, where the bus is to be a 169 kV bus. Outer housing 11 may be formed conventionally of aluminum or any other conductive material.

Insulating spacers or supports 12 and 12*a* and other similar supports are provided along the length of conductor 10 and housing 11 to centrally support the conductor 10 within housing 11.

Figure 5:
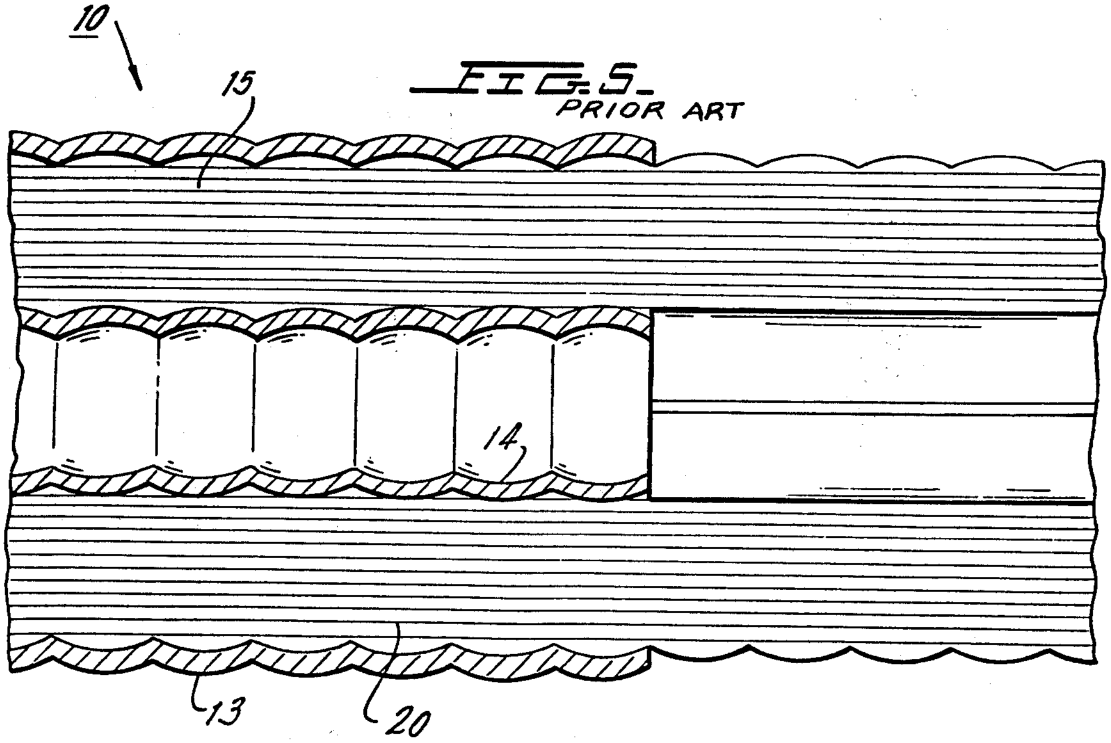
FIG. 5 PRIOR ART
FIG. 5 illustrates the manner in which the flexible conductor of FIG. 2 is prepared by the removal of the inner and outer corrugated tubes or sheaths prior to connection of the novel terminal of the present invention to the central conductor.

As shown in FIGS. 1, 2 and 5, the flexible conductor 10 consists of an outer conductive sheath 13, which is a corrugated tube for flexibility, an inner corrugated sheath 14, which is also corrugated for flexibility, and a plurality of trapezoidally shaped conductive strand sections, best shown in FIG. 2 as the trapezoidally shaped conductive strand packages or segments 15 to 20. The conductive strands as well as conductive sheaths 13 and 14 may be of aluminum.

FIG. 2 illustrates the use of six trapezoidal segments 15 to 20 but other numbers of segments could have been used. The manufacture of these trapezoidal segments is well known and each is made of a plurality of small gauge parallel aluminum wires. These segments are wound much the same as a rope and pass through dies which form the trapezoidal shapes shown. The individual segments are then wound on the corrugated tube 14 and then covered with the corrugated outer sheath 13.

Figure 3:
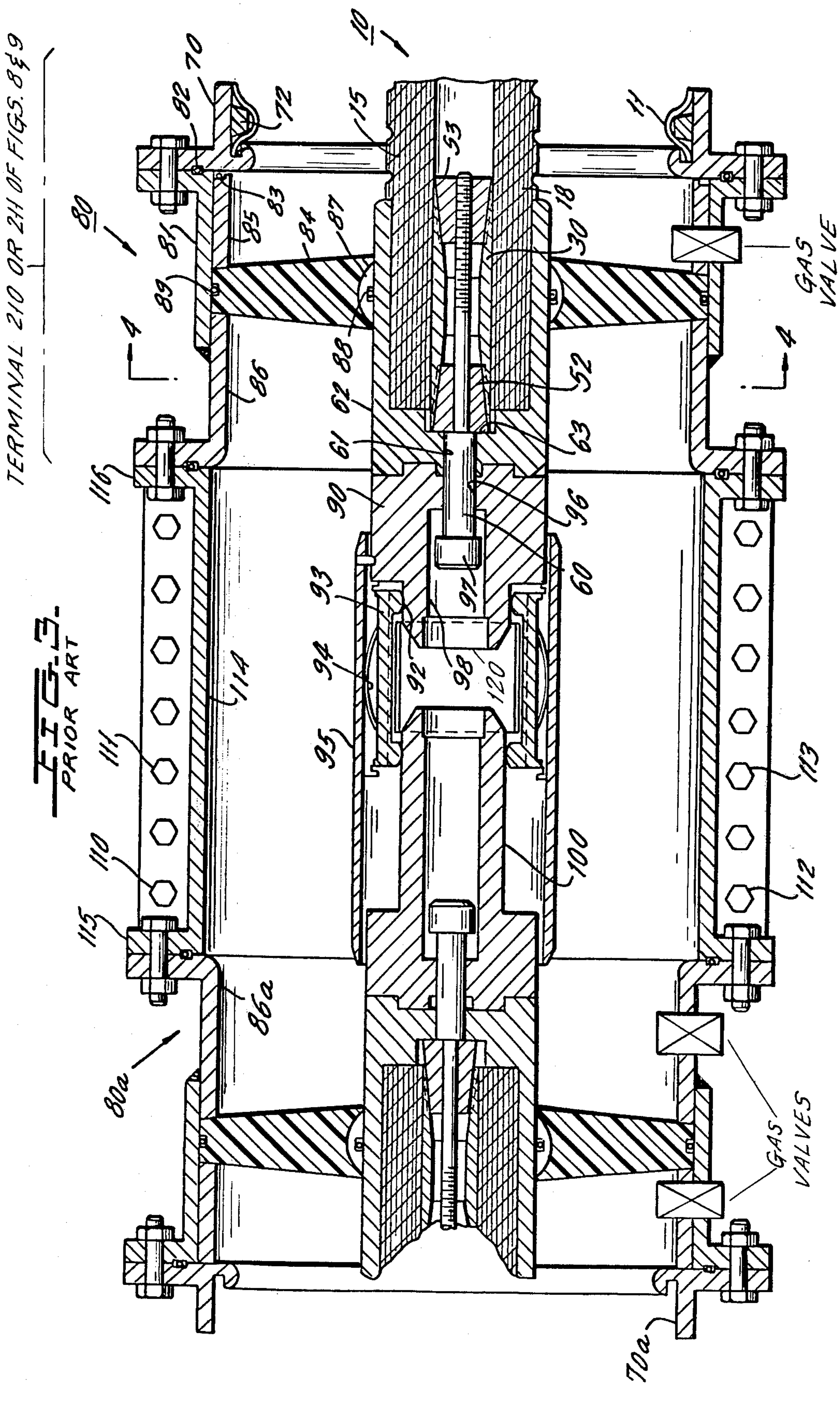
FIG. 3. PRIOR ART
FIG. 3 is an enlarged cross-sectional view of a terminal structure which can be used with the present invention as applied to the ends of two gas-insulated bus sections to connect the two sections together in the field.

In order to make a connection to a terminal end of conductor 10, a short length of the inner and outer sheaths 13 and 14 is removed, as illustrated in FIG. 5, at the right-hand end of conductor 10. Thereafter, an aluminum terminal expander member 30 is inserted into the end of the cable strands, as shown in FIG. 3. Note that FIG. 3 illustrates the location of terminal 210 or 211 of FIGS. 8 and 9.

The expander 30, shown in detail in FIGS. 3 and 4, will have any suitable diameter to fit between the various strand packages and preferably has the hexagonal cross-section best seen in FIGS. 4 and 6 in order to key expander 30 against relative rotation with conductor 10 as the expander is being operated, as will be later described.

The expander 30 is also provided with slotted end sections shown, for example, by the slots 31 to 36 of FIG. 6 and similar slots, partly shown in FIG. 7 as slots 38 to 41, in the other end of expander 30. Note that two machine grooves 42 and 43, shown in FIG. 7, are also formed in the terminal expander member 30 to permit the outward bending of the fingers defined by the various slots 31 to 41. Note further that the interior diameters 50 and 51 at the ends of the terminal expander are slightly conical in shape, whereby the conical diameters 50 and 51 are at an angle of about 9° to the axis of expander 30.

Figure 4:
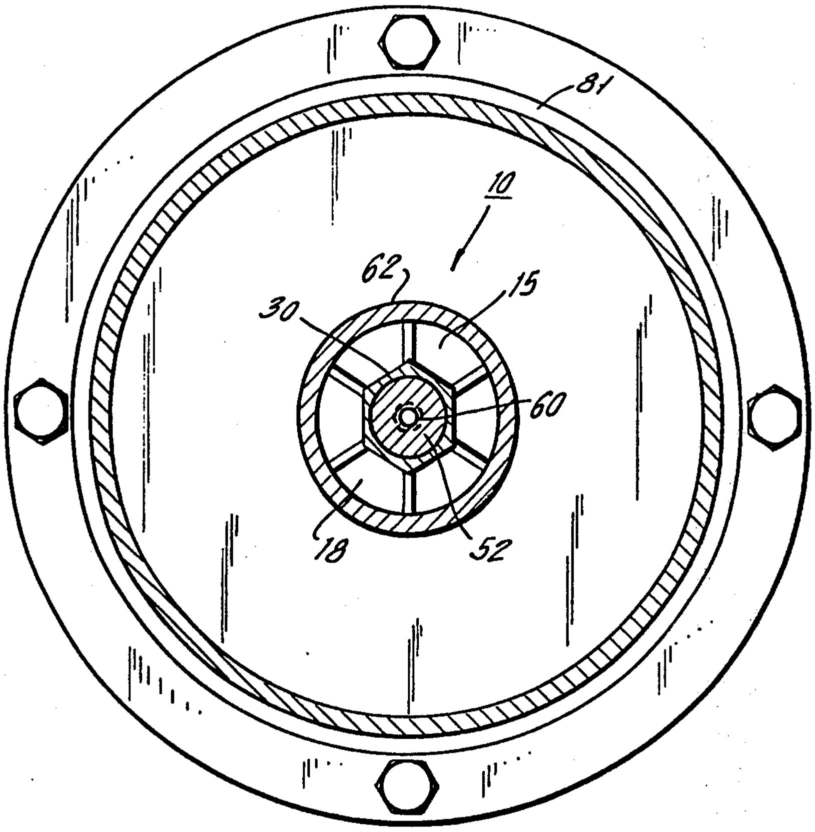
FIG. 4 PRIOR ART
FIG. 4 is a cross-sectional view of FIG. 3 taken across the section line 4—4 in FIG. 3.

The terminal expander 30, as best shown in FIGS. 3 and 4, then receives wedge nuts 52 and 53 in its opposite ends, which wedge nuts have conical shapes which generally conform in angle or which are sharper in angle than the angle defined by the conical internal surfaces 50 and 51, respectively. Wedge nut 53 threadably receives the threaded portion of bolt 60, whereas wedge nut 52 has a large enough opening to pass over the unthreaded shank of bolt 60.

Bolt 60 extends through opening 61 in an outer solid conductive cylinder 62 which encloses the outer diameter of the segments 15 to 20 of the conductor 10. Bolt 60 has a shoulder 63 which bears against wedge 52. Bolt 60 passes through wedge 52 and is threaded into wedge 53. As will be later described in detail, the tightening of the bolt 60 causes the wedges 52 and 53 to be drawn together, thereby to cause the fingers, defined by the slots in the opposite ends of expander 30, to flex outwardly, thus driving the trapezoidal strand sections into high pressure contact with the outer conductive cylinder 62.

It will be noted that the hexagonal shape of expander 30 causes it to key into the individual strand sections to prevent relative rotation of the expander 30 within cable 10 as the bolt 60 is being tightened. Any suitable connection can then be made to the solid conductive cylinder 62 with much greater ease than to the individual stranded elements of the cable 10.

One terminal subassembly for an entire flexible cable is shown in FIG. 3, wherein a terminating flange 70 is welded onto the end of corrugated housing 11. Projecting locking members, or a continuous split locking ring 72, projects into the end corrugation of housing 11. The locking ring 72 may be segmented and can be connected to the flange 70 as by externally operated bolts or the like, not shown.

FIG. 3 illustrates the connection of the terminal end of the cable shown on the right-hand side of FIG. 3 to a similar apparatus which may be another terminal end of another flexible cable which would be supported by the terminal flange 70*a*, shown on the left-hand side of FIG. 3.

FIG. 3 also shows a terminal subassembly 80 which is preassembled in the factory and easily clamped to the terminal end of the gas conductor in the field. Terminal structure 80 consists of an outer bolt flange 81 which can be clamped to flange 70 and compress seals 82 and 83 to ensure a gas-tight connection to the flange 70 and the outer housing 11. A disk-shaped support insulator 84 is then contained between ring 85 and bolt ring 86 which is welded to the bolt ring 81. The conductive cylinder 62 is then connected to the metallic insert 87 of insulator 84, with suitable sliding seal 88 providing a gas seal against leakage of gas from the interior of housing 11. A similar seal 89 seals the top of insulator 84.

The conductor 62 is then welded to a plug-in type conductor 90 which has a sliding contact surface 92, which is engageable by sliding finger contacts 93 which are circularly arranged around the periphery of member 90.

The entire subassembly 80, described above, to the left of flange 70 is factory-assembled and can be easily and simply connected to the end of the bus 10. Thus, the assembler will first insert the expander 30 into the properly prepared cable 10 and will thereafter bolt the assembly 80 to the end of the bus by bolting together flanges 81 and 70. Thereafter, the bolt 60 is rotated to cause wedges 52 and 53 to be drawn together, thereby to compact the strand sections 15 to 20 against conductive cylinder 62 in a compact low-resistance manner. The terminal end is then sealed with a threaded in plug 120.

Note that, after pressure is applied, the wedges 52 and 53 will lock in place because of the low angle used on the wedges. The assembly may then be used for plug-in connection in a conventional manner to any other component.

By way of example, in FIG. 3, an assembly is shown to the left of the figure, which includes flange 70*a* and an assembly 80*a* which can be identical to assembly 80 and which contains an elongated male contact 100 which slidably receives the conductive fingers 93 in order to connect conductive member 90 to the conductive member 100. The assembly of the finger contacts 93 and their respective biasing springs 94 are contained within a corona shield 95 which is loosely fixed to the end of conductive member 90. It will be noted that the bolt 60 extends through an opening 96 in member 90 and the bolt head 97 is accessible through the channel 98 in member 90.

A mechanical and gas-tight connection is then made between flange 86 of a subassembly 80 and flange 86*a* of flange subassembly 80*a* by semicircular housing sections which bolt together along their axial length by bolts, such as bolts 110, 111, 112, and 113 to form a cylindrical housing 114 which has bolt flanges 115 and 116 which are connected to flanges 86*a* and 86, respectively.

Gas valves identified in FIG. 3 by the label are provided to enable the purging of nitrogen gas from the interior of the cable (in combination with a similar gas valve) at the opposite end of the cable, and to enable the loading of a suitable electronegative gas into the cable.

Although a preferred embodiment of this invention has been described, many variations and modifications will now be apparent to those skilled in the art, and it is therefore preferred that the instant invention be limited not by the specific disclosure herein but only by the appended claims.

The embodiments of the invention in which an exclusive privilege or property is claimed are defined as follows:

1. A process for shipping and placing a flexible transmission line cable into service comprising the steps of fabricating a continuous length of high voltage flexible transmission line cable, electrically testing said cable to determine its suitability for operating in service, filling said cable with a dry high dielectric inert gas under a relatively low positive pressure and sealing the ends of said cable, winding said cable on a shipping reel and shipping said cable to an installation site, unreeling said cable at said installation site, purging said inert gas from said cable and loading an electronegative gas into said cable at a relatively high positive pressure, and connecting said cable into an electrical system.

2. The process of claim 1, wherein said dry gas is nitrogen at a pressure of about 4 to 5 p.s.i.g.

3. The process of claim 2, wherein said electronegative gas is sulfur hexafluoride at a pressure of about 45 p.s.i.g.

4. The process of claim 1, wherein said cable has a diameter greater than about 250 millimeters and a length of about 100 meters.

5. The process of claim 4, wherein said reel has a spool diameter of at least 10 times that of the cable diameter.

6. The process of claim 5, wherein said dry gas is nitrogen at a pressure of about 4 to 5 p.s.i.g.

7. The process of claim 6, wherein said electronegative gas is sulfur hexafluoride at a pressure of about 45 p.s.i.g.

* * * * *